US012259193B2

(12) United States Patent
Haynes

(10) Patent No.: US 12,259,193 B2
(45) Date of Patent: Mar. 25, 2025

(54) BUOYANCY-BASED PLATFORM ASSEMBLY FOR PHASE CHANGE MATERIAL THERMAL MANAGEMENT

(71) Applicant: Georgia Tech Research Corporation, Atlanta, GA (US)

(72) Inventor: Comas Haynes, Atlanta, GA (US)

(73) Assignee: GEORGIA TECH RESEARCH CORPORATION, Atlanta, GA (US)

( * ) Notice: Subject to any disclaimer, the term of this patent is extended or adjusted under 35 U.S.C. 154(b) by 234 days.

(21) Appl. No.: 17/969,456

(22) Filed: Oct. 19, 2022

(65) Prior Publication Data

US 2023/0119645 A1 Apr. 20, 2023

Related U.S. Application Data

(60) Provisional application No. 63/257,591, filed on Oct. 20, 2021.

(51) Int. Cl.
*F28D 20/02* (2006.01)
*F28D 20/00* (2006.01)

(52) U.S. Cl.
CPC .... *F28D 20/021* (2013.01); *F28D 2020/0069* (2013.01); *F28D 2020/0095* (2013.01)

(58) Field of Classification Search
CPC ......... F28D 20/0039; F28D 2020/0047; F28D 2020/0065; F28D 2020/0073; F28D 2020/0095; F28D 2020/0069; F28D 20/021
See application file for complete search history.

(56) References Cited

U.S. PATENT DOCUMENTS

| 4,294,078 A * | 10/1981 | MacCracken ......... F28D 20/021 126/618 |
| 4,696,338 A * | 9/1987 | Jensen .................. F28D 20/025 165/104.11 |
| 2004/0134647 A1 * | 7/2004 | Sienel ................. F28D 20/0039 165/10 |
| 2008/0264323 A1 * | 10/2008 | Gosling ................... B63G 8/22 114/330 |

(Continued)

FOREIGN PATENT DOCUMENTS

| CN | 105792875 A | 7/2016 |
| CN | 105829817 B1 | 1/2019 |
| CN | 110747525 A | 2/2020 |

OTHER PUBLICATIONS

Kauffeld et al., "Direct Contact Chilling and Freezing of Foods in Ice Slurries," Chapter—Jan. 2005.

(Continued)

*Primary Examiner* — Tho V Duong
(74) *Attorney, Agent, or Firm* — Blank Rome LLP

(57) ABSTRACT

The disclosed technology includes systems and methods of managing temperature distributions of phase change material. The disclosed technology can include a system comprising a platform having a passageway therethrough. The platform can include a density that is less than a density of the phase change material when in a solid phase and greater than a density of the phase change material when in a liquid phase. The system can further include a whip rod disposed at least partially in the passageway of the platform.

20 Claims, 1 Drawing Sheet

(56) References Cited

U.S. PATENT DOCUMENTS

| | | | |
|---|---|---|---|
| 2011/0083436 A1* | 4/2011 | White | F01K 3/08 |
| | | | 165/104.19 |
| 2011/0168159 A1* | 7/2011 | Lataperez | F28D 20/0039 |
| | | | 126/400 |
| 2017/0010023 A1 | 1/2017 | Slocum et al. | |
| 2019/0219339 A1* | 7/2019 | Cave | F28D 20/0056 |

OTHER PUBLICATIONS

Kauffeld et al., "Ice Slurry Applications," *Int J. Refrig.* Dec. 1, 2010; 33 (8): 1491-1505.

Zhang et al., "Analysis of ice slurry production by direct contact heat transfer of air and water solution," *J Zhejiang Univ-Sci A(appl Phys & Eng)*, 2013, 14(8): 583-588.

Mouneer et al., "Heat transfer performance of a newly developed ice slurry generator: A comparative study," *Ain Shams Engineering Journal*, vol. 1, Issue 2, Dec. 2010, pp. 147-157.

Energy Efficient MaximICE Technology/slurry ice (icesynergy.com).

\* cited by examiner

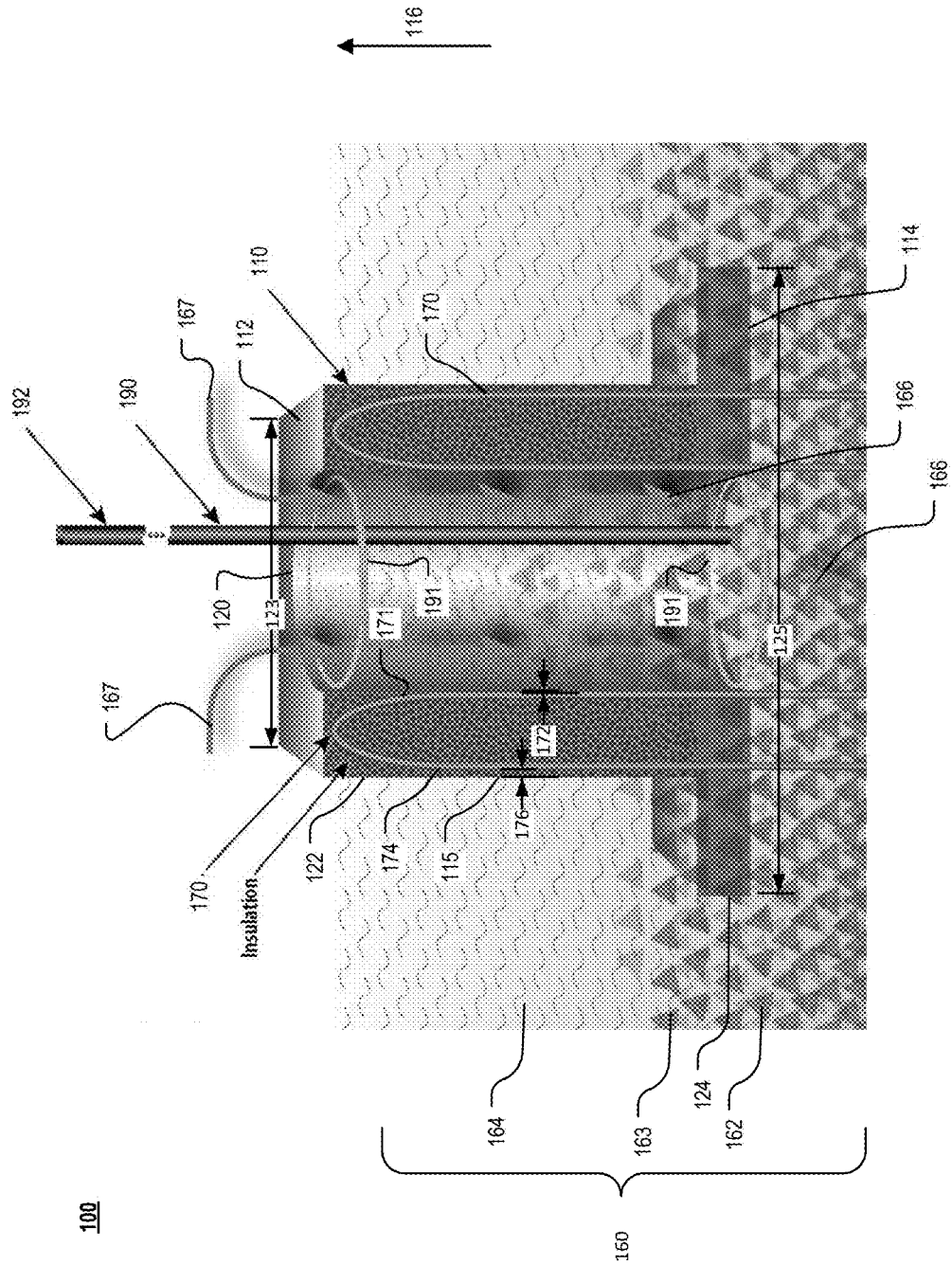

BUOYANCY-BASED PLATFORM ASSEMBLY FOR PHASE CHANGE MATERIAL THERMAL MANAGEMENT

CROSS REFERENCE TO RELATED APPLICATIONS

This application claims priority to U.S. provisional application Ser. No. 63/257,591, filed Oct. 20, 2021, the entirety of which is incorporated by reference herein.

FIELD OF DISCLOSURE

The disclosed technology relates generally to systems and methods of managing temperature distributions of phase change material.

BACKGROUND

Phase change materials (PCMs) are commonly used in systems where it is advantageous to store thermal energy such as energy storage applications, cold supply chain applications, heating ventilation and air conditioning (HVAC) applications, renewable energy systems, and other similar systems. Phase change materials release and absorb energy during transitions between phases (e.g., transition from a liquid to a solid and vice-versa). Unfortunately, it can be difficult to manage temperature distribution throughout a phase change material due to an increase in the thermal resistance as the distance between phase-change front and the heat sink increases during a phase change. Furthermore, as gaps may form within the PCM solid phase further reducing the distribution of thermal energy.

What is needed, therefore, is a system and method that can facilitate effective temperature management of a PCM.

SUMMARY

These and other problems can be addressed by the technologies described herein. Examples of the present disclosure relate generally to systems and methods of managing temperature distributions of phase change material.

The disclosed technology can include a system comprising a platform having a passageway therethrough. The platform can include a density that is less than a density of the phase change material when in a solid phase and greater than a density of the phase change material when in a liquid phase. The system can further include a whip rod disposed at least partially in the passageway of the platform.

The platform can be configured to move through the phase change material while the phase change material changes a phase of the phase change material.

The whip rod can be a variable length whip rod. The whip rod can include a variable length section. The whip rod can be configured to orbit around a central axis of the passageway proximate an edge of the passageway. The whip rod can be configured to reduce scale buildup on a surface of the platform.

The platform further can include a non-stick surface on a side of the platform facing the phase change material when in a solid phase.

The system can further include an extensible heat transfer fluid line that can be configured to extend or retract as the platform moves between (1) a first position corresponding to a position of the platform when a majority of the phase change material is in the liquid phase and (2) a second position corresponding to a position of the platform when a majority of the phase change material is in the solid phase. The extensible heat transfer fluid line can be tensioned.

The system can be configured to induce localized flow fields of PCM liquid to cause liquid to flow to a location of solidification activity.

The platform can include a base portion configured to extend laterally along a line between a first phase and a second phase of the phase change material. The platform can further include a housing portion affixed to, and extending from, the base portion. The passage can pass through the base portion and the housing portion. The extensible heat transfer fluid line can be configured to pass through the base portion and the housing portion. The base portion and the housing portion can both comprise a generally rectangular cuboid shape. The passage can comprise a generally cylindrical shape. The platform can comprise an insulative material.

One general aspect disclosed herein includes a system for managing temperature distribution of a phase change material. The system also includes a platform and may include a passageway therethrough, the platform may include a density that is less than a density of the phase change material when in a solid phase and greater than a density of the phase change material when in a liquid phase.

Implementations may include one or more of the following features either alone or in combination. The system may include a whip rod disposed at least partially in the passageway of the platform. The whip rod may be an extendable whip rod. The whip rod may include a variable length section. The density may be an effective density. The platform may be configured to move through the phase change material while the phase change material changes a phase of the phase change material. The whip rod may be configured to orbit around a central axis of the passageway proximate an inside surface of the passageway. The whip rod may be configured to reduce scale buildup on a surface of the platform. The system may include at least one extensible heat transfer fluid line configured to extend or retract as the platform moves between (1) a first position corresponding to a position of the platform when a majority of the phase change material is in the liquid phase and (2) a second position corresponding to a position of the platform when a majority of the phase change material is in the solid phase. The extensible heat transfer fluid line may be tensioned.

In one aspect of the disclosure, the system may be configured to induce localized flow fields of PCM liquid to cause liquid to flow to a location of solidification activity. The platform may include: a base portion configured to extend laterally along a line between a first phase and a second phase of the phase change material; and a housing portion affixed to, and extending from, the base portion, where the passage passes through the base portion and the housing portion. The base portion may have a width and the housing portion may have a width where the base portion width is greater than the housing portion width. In yet another aspect of the disclosure, the system may include an extensible heat transfer fluid line configured to extend or retract as the platform moves between (1) a first position corresponding to a position of the platform when a majority of the phase change material is in the liquid phase and (2) a second position corresponding to a position of the platform when a majority of the phase change material is in the solid phase. The extensible heat transfer fluid line may pass through the base portion and the housing portion. The base portion and the housing portion both may include a generally rectangular cuboid shape, and where the passage may include a generally cylindrical shape. The platform may include an insulative material. The at least one heat transfer fluid line may include a first portion and second portion, the first portion being proximate to a surface of the passageway. The second portion may be proximate an outside surface of the platform, the first portion has a first depth beneath the surface of the passageway and second portion has a second depth below the outside surface, and first depth is less than second depth.

Additional features, functionalities, and applications of the disclosed technology are discussed herein in more detail.

BRIEF DESCRIPTION OF THE FIGURES

The accompanying drawings, which are incorporated in and constitute a part of this specification, illustrate various aspects of the presently disclosed subject matter and serve to explain the principles of the presently disclosed subject matter. The drawings are not intended to limit the scope of the presently disclosed subject matter in any manner.

FIG. 1 is cross-sectional illustration of a platform assembly deployed in a phase change material, in accordance with the disclosed technology.

DETAILED DESCRIPTION

Although various aspects of the disclosed technology are explained in detail herein, it is to be understood that other aspects of the disclosed technology are contemplated. Accordingly, it is not intended that the disclosed technology is limited in its scope to the details of construction and arrangement of components expressly set forth in the following description or illustrated in the drawings. The disclosed technology can be implemented and practiced or carried out in various ways. Accordingly, when the present disclosure is described in the context of thermal management of a PCM, it will be understood that other implementations can take the place of those referred to.

It should also be noted that, as used in the specification and the appended claims, the singular forms "a," "an," and "the" include plural references unless the context clearly dictates otherwise. References to a composition containing "a" constituent is intended to include other constituents in addition to the one named.

Also, in describing the disclosed technology, terminology will be resorted to for the sake of clarity. It is intended that each term contemplates its broadest meaning as understood by those skilled in the art and includes all technical equivalents which operate in a similar manner to accomplish a similar purpose.

Ranges may be expressed herein as from "about" or "approximately" or "substantially" one particular value and/or to "about" or "approximately" or "substantially" another particular value. When such a range is expressed, the disclosed technology can include from the one particular value and/or to the other particular value. Further, ranges described as being between a first value and a second value are inclusive of the first and second values. Likewise, ranges described as being from a first value and to a second value are inclusive of the first and second values.

Herein, the use of terms such as "having," "has," "including," or "includes" are open-ended and are intended to have the same meaning as terms such as "comprising" or "comprises" and not preclude the presence of other structure, material, or acts. Similarly, though the use of terms such as "can" or "may" are intended to be open-ended and to reflect that structure, material, or acts are not necessary, the failure to use such terms is not intended to reflect that structure, material, or acts are essential. To the extent that structure, material, or acts are presently considered to be essential, they are identified as such.

It is also to be understood that the mention of one or more method steps does not preclude the presence of additional method steps or intervening method steps between those steps expressly identified. Moreover, although the term "step" can be used herein to connote different aspects of methods employed, the term should not be interpreted as implying any particular order among or between various steps herein disclosed unless and except when the order of individual steps is explicitly required. Further, the disclosed technology does not necessarily require all steps included in the methods and processes described herein. That is, the disclosed technology includes methods that omit one or more steps expressly discussed with respect to the methods described herein.

The components described hereinafter as making up various elements of the disclosed technology are intended to be illustrative and not restrictive. Many suitable components that would perform the same or similar functions as the components described herein are intended to be embraced within the scope of the disclosed technology. Such other components not described herein can include, but are not limited to, similar components that are developed after development of the presently disclosed subject matter.

Referring now to the drawings, in which like numerals represent like elements, the present disclosure is herein described. FIG. 1 illustrates an example phase change thermal system 100 for managing temperature distribution of a phase change material is shown. FIG. 1 will be described with respect thermal discharge phase in which heat is being transferred out of the system 100 and thus solidifying the PCM. However, it should be noted that the reverse phase (thermal absorption phase) is equally applicable, or alternatively, or in addition to, the phase change thermal system 100 may be utilized with alternative heat input into the system. The phase change thermal system 100 includes, for example a vertical cross-sectional view of a buoyant platform 110. The buoyant platform 110 has a top surface 112 and a bottom surface 114. In this context, a "top" or "up" direction is noted in the direction of arrow 116.

Buoyant platform 110 may include a passageway 120, which may extend from the top surface 112 to the bottom surface 114. In operation, the buoyant platform is at least partially submerged within PCM 160 such that it resides at the phase interface 163 of the solid phase 162 (shown in triangles) of the PCM 160 and the liquid phase 164 (shown in wavy curves). This is accomplished by configuring the buoyant platform 110 to have an effective density between that of the solid phase 162 and the liquid phase 164. As shown, the solid phase 162 has a greater density than the liquid phase 164.

Buoyant platform 110 may include one or more heat transfer fluid lines 170 creating fluid passageways in which heat transfer fluid may flow through the heat transfer fluid lines 170 due to either natural or forced convection, e.g., via an external pump. The heat transfer fluid lines 170 may include a first portion 171 and a second portion 174. As shown, the first portion 171 has a first depth 172 beneath the surface of the passageway 120 and the second portion 174 has a second depth 176 below an outside surface 115 of the buoyant platform 110. In the example shown, the first depth 172 is less than the second depth 176. In such configuration, for a given constant temperature heat transfer fluid within the heat transfer fluid line 170, heat will more readily transfer from passageway 120 to the first portion 171 then from the outside surface 115 to the second portion 174, which will promote preferential nucleation and phase change of the PCM 160 within the passageway 120. As an optional additional or alternative feature, the first portion 171 can be configured to receive the cold heat transfer fluid and the second portion 174 can be configured to discharge the heat transfer fluid, which would have been warmed by receiving heat from the PCM 160 in a thermal absorption phase, thus causing the colder heat transfer fluid to reside along the passageway 120. As an optional additional or alternative feature, the portion of the buoyant platform 110 containing the heat transfer fluid line 170 may include an insulative material that is resistive to the transfer of heat. As another optional or alternative feature, a heat conductive material (not shown) (that is, a material having a higher heat transfer coefficient then a bulk or insulative material of the buoyant platform 110 near the second portion 174) may be attached to the inside surface of the passageway 120, optionally in contact with the first portion 171 of the heat transfer fluid line 170 to promote heat transfer from the passageway 120 to the heat transfer fluid line 170.

It should be noted that although the heat transfer fluid lines 170 are shown in a "U" configuration, the heat transfer fluid lines 170 may also be implanted in other configurations adapted to provide the desired heat transfer effect while also meeting the effective density design goals of the buoyant platform 110.

Optionally, as will be discussed below, the phase change thermal system 100 may also include a whip rod 190 positioned within the passageway to further promote preferential phase change of the PCM 160 within the passageway 120.

During the thermal discharge phase, which may be optionally aided by using any one or more of the above-mentioned optional features to preferentially phase change the PCM 160 within the passageway 120, the PCM will freeze within the passageway 120. Due to the increased density of solid phase 162 PCM 160 as compared to the previous liquid phase 164, the solid phase 162 will sink from the liquid phase 164 as indicated by arrows 166 and will result in a decreased volume of PCM 160 for the same mass of PCM 160. That reduction in volume and sinking induces a local low-pressure region within the passageway 120, which then draws in more liquid phase 164 PCM 160, as indicated at arrows 167, continuing the cycle. This drawing of more liquid phase 164 PCM 160 into the passageway 120 amounts to a "reverse chimney" effect, promoting continuous flow.

Further, as solid phase 162 is created and deposited at the phase interface 163, due to the relatively lighter effective density of the buoyant platform 110, the platform passively elevates due to buoyant forces to remain above the bulk solid/slurry front (also referred to herein as the phase interface 163) given engineered buoyancy. Solid PCM is indicated by the triangles shown collecting at the bottom, and liquid PCM is indicated by the wavy curves.

As noted previously, heat transfer fluid lines 170 may include connections (not shown) or additional heat transfer lines (not shown) connected to an external heat exchanger and/or pump. Optionally the heat transfer lines external to the buoyant platform 110 may be extendable to allow for raising and lowering of the buoyant plat form 110. Heat transfer fluid lines 170 may be extendable, for example, through the use of resilient or elastic materials, coils of excess lines (slack), accordion folds to allow for expansion and contraction, or any combination thereof.

The disclosed phase change thermal system 100 uses a platform assembly that changes elevation (i.e., floats or sinks) in conjunction with the change in solid fraction of a thermally cycling phase change material (PCM) 160. The platform 110 assembly is particularly relevant during the thermal discharge or "freezing" phase of the PCM thermal cycle, because it: i) distinctively reduces the average distance between the phase change front(s) and heat sink; ii) induces a localized, forced convective cooling effect due to the reverse chimney effect described above (as opposed to less intense natural convection that may or may not occur in bulk phase change material without the disclosed phase change thermal system 100); iii) distinctively provides for the continued initiation of solidification, for example as discussed above; and iv) precludes or mitigates interfacial (thermal) contact resistance associated with solid PCM phase having imperfect contact with the heat sink structure.

The platform is based upon a structural design that allows it to have a tailored, effective density that is customized based upon the PCM material; i.e., it's ideal effective density would be between that of the PCM's 160 liquid phase 164 and solid phase 162 so that it can stay above the bulk boundary between the two phases (phase interface 163). As noted herein, effective density refers to the density of the portions of phase change thermal system 100 that are either part of buoyant platform 110 or connected to it to influence the overall mass/volume of the floating portion of the system 100. For example, the buoyant platform 110 materials geometry contribute to its effective density as well as, for example, the heat transfer fluid lines 170 and any heat transfer fluid within the heat transfer fluid lines 170 and, for example any downward force applied by the weight of tubing connected to the heat transfer fluid lines 170.

Once a PCM 160 is chosen, the buoyant platform 110 can be adjusted as needed to tune the effective density of the buoyant platform 110 as needed. The buoyant platform 110 may include, for example, a housing portion 122 and a base portion 124. The passageway 120 may be contained both in the housing portion 122 and the base portion 124. The housing portion 122 has a width 123 and the base portion 124 has a width 125. As shown, the base portion 124 width 125 is greater than the housing portion 122 width 123, which in certain configurations may aid in passively elevating the buoyant platform 110 with a rising phase interface 163. However, in other configurations, the width 125 may be the same as or smaller than width 123, which in some configurations may aid in maintaining a desired orientation for the buoyant platform 110.

In one alternative or optional example, all or portions of either the housing portion 122 and/or the base portion 124 can contain regions of different materials to adjust the effective density of the buoyant platform 110. For example, the base portion 124 may include internal regions that are voids that are filled with a less dense material (e.g., foam, air, vacuum) or a more dense material (e.g., metal) allowing for effective control of the overall effective density of the buoyant platform 110.

As described above, various optional features related to the design of the buoyant platform 110 work to preferentially nucleate and freeze the PCM 160 along the inner surface of the passageway 120, thus inducing localized flow fields at arrows 167 of PCM 160 liquid phase 164 in a manner that essentially "pumps" the liquid to the heat sink/solidification activity. Phase change thermal system 100 may also utilize mechanical agitation to both promote nucleation, a precursor to solidification, and phase change within the passageway 120 and also to aid in descaling the solid phase 162 PCM from the passageway 120 surfaces. Solidification has some distinct challenges in a number of PCM application attempts, and this arrangement addresses that arduous part of PCM thermal cycling. As shown in FIG. 1, whip rod 190 may be included with the passageway 120 to provide such mechanical agitation. The whip rod 190 may spin on its own vertical axis and/or orbit around the vertical axis of the passageway 120 near or contacting the inside surface of passageway 120 as indicated by the orbiting path 191. Passive routing of liquid PCM through the whip rod solidification process prevents (or minimizes) thermal resistances/hindrances of "sheets" of solid (including contact resistances due to gaps) forming on the heat sink. The engineered phenomena is motivated by the usage of whip rod technology in the production of ice slurry, such as incorporated by Liquid Ice Technology (Packaging Technology Group); although in that case there is no attempted platform buoyancy. The high frequency whip rod "orbits" around the passageway interior to facilitate nucleation, hence solidification, while yet precluding scale build-up on the interior, passageway surfaces. The whip rod 190 may orbit 191 the passageway at a speed sufficient to induce nucleation of a chosen PCM 160, for example between several hundred rotations per minute (RPM) to tens of thousands of RPMs. If the rotation speed is too low, the whip rod 190 may not be effective at inducing nucleation or reducing scale, yet if the RPMS are too high, although effective, there will likely be no net positive gain while there is a loss of efficiency.

As the buoyant platform 110 raises and lowers with the phase interface 163, the whip rod 190 may similarly be raised and lowered. For example, the phase interface 163 may be monitored through the use of one or more optical or electromagnetic radiation sensors (not shown) to provide a level indication of the phase interface 163 such that the whip rod 190 may be raised and lowered accordingly. For example, the whip rod 190 may be raised and lowered through the use of an extendable portion 192, which may be, for example, telescopic, or the whip rod 190 may be connected to an external mechanical actuator for raising and lowering the whip rod 190.

The disclosed phase change thermal system 100, and example disclosed features thereof, are particularly relevant to aiding the thermal discharge or "freezing" phase of PCM thermal management due to the example advantages of promoting nucleation within the passageway 120, downward thermal siphoning of the PCM 160, and the clearing of solid phase 162 crystals from the walls of the passageway 120. However, as noted previous, it is also equally appliable in the reverse, i.e., to transfer heat into the PCM 160, although PCM systems do not suffer from the same phase interface 163 issues as when thermally discharging. Phase change thermal system 100 can be proactively or retroactively engineered into PCM applications such as, but not limited to, thermal energy storage, recuperative process thermal management, building environmental control, and manufacturing processes involving solidification. There may also be niche opportunities for device-level thermal management.

As noted, previously, the disclosed example phase change thermal system can include a number of optional features that may be used alone or in combination, which can promote certain advantages, for example:

a. The platform is buoyant at an effective density that is sufficiently less than that of the high solid fraction phase, so that it passively elevates above the high solid fraction phase that is forming. It will, however, be more dense than the liquid phase such that it remains just above the bulk solid, and it will naturally sink to the bottom at the end of the PCM thermal charge/melt phase.

b. Composite, variable length whip rod(s) can be used that can retract/extend as the platform elevates or descends.

c. Tensioned, extensible heat transfer fluid lines that have natural contraction when the platform lowers at the end of the PCM melt phase.

PCM thermal discharge or "freezing" can be an especially cumbersome part of passive PCM thermal cycling given the aforementioned issues of growing thermal resistance as the path length between phase-change front and heat sink increases, as well as potential contact resistance "gaps" that may form within the PCM solid phase. Active systems that would endeavor to circumvent these passive system issues with conventional pumping of liquid PCM are not trivial attempts. Certain PCMs are harder to solidify given their natural resistance to requisite nucleation. The present system and disclosure reduces or alleviates those challenges by progressively translating the heat sink to and through the liquid PCM region, and it optionally incorporates highly localized agitation (via whip rod stirring in an enclosure such as, but not limited to, what is shown and described with reference to FIG. 1) to "seed" solidification. While the above disclosure has focused upon the thermal discharge phase of PCM thermal cycling, it is readily compatible with additional thermal management that focuses upon the thermal charging/melting phase of PCM thermal management.

As conveyed regarding general utility, the disclosed phase change thermal systems 100 and buoyant platforms 110 can be proactively or retroactively engineered into PCM applications such as, but not limited to, thermal energy storage, recuperative process thermal management, building environmental control, and manufacturing processes involving solidification. There may also be niche opportunities for device-level thermal management. This thus points to an open-ended set of applications such as, but not limited to, cold supply chain, thermal energy storage, advanced HVAC opportunities, and renewable energy systems.

As will be appreciated, the methods described herein can be varied in accordance with the various elements and implementations described herein. That is, methods in accordance with the disclosed technology can include all or some of the steps described above and/or can include additional steps not expressly disclosed above. Further, methods in accordance with the disclosed technology can include some, but not all, of a particular step described above. Further still, various methods described herein can be combined in full or in part. That is, methods in accordance with the disclosed technology can include at least some elements or steps of a first method and at least some elements or steps of a second method.

While the present disclosure has been described in connection with a plurality of example aspects, as illustrated in the various figures and discussed above, it is understood that other similar aspects can be used, or modifications and additions can be made to the described subject matter for performing the same function of the present disclosure without deviating therefrom. In this disclosure, methods and compositions were described according to aspects of the presently disclosed subject matter. But other equivalent methods or compositions to these described aspects are also contemplated by the teachings herein. Therefore, the present disclosure should not be limited to any single aspect, but rather construed in breadth and scope in accordance with the appended claims. Moreover, various aspects of the disclosed technology have been described herein as relating to methods, systems, devices, and/or non-transitory, computer-readable medium storing instructions. However, it is to be understood that the disclosed technology is not necessarily limited to the examples and embodiments expressly described herein. That is, certain aspects of a described system can be included in the methods described herein, various aspects of a described method can be included in a system described herein, and the like.

What is claimed is:

1. A system for managing temperature distribution of a phase change material, the system comprising:
   a platform comprising a passageway therethrough, the platform comprising a density that is less than a density of the phase change material when in a solid phase and greater than a density of the phase change material when in a liquid phase;
   a whip rod disposed at least partially in the passageway of the platform, wherein the whip rod is an extendable whip rod.

2. The system of claim 1, wherein the density of the platform is an effective density.

3. The system of claim 1, wherein the platform is configured to move through the phase change material while the phase change material changes a phase of the phase change material.

4. The system of claim 1, wherein the system is configured to induce localized flow fields of PCM liquid to cause liquid to flow to a location of solidification activity.

5. The system of claim 1, wherein the platform comprises an insulative material.

6. The system of claim 1, further comprising at least one heat transfer fluid line at least partially within the platform, wherein the at least one heat transfer fluid line includes a first portion and second portion, the first portion being proximate to a surface of the passageway.

7. The system of claim 6, wherein the second portion is proximate an outside surface of the platform, the first portion has a first depth beneath the surface of the passageway and second portion has a second depth below the outside surface, and first depth is less than second depth.

8. A system for managing temperature distribution of a phase change material, the system comprising:
   a platform comprising a passageway therethrough, the platform comprising a density that is less than a density of the phase change material when in a solid phase and greater than a density of the phase change material when in a liquid phase; and
   a whip rod configured to orbit around a central axis of the passageway proximate an inside surface of the passageway.

9. The system of claim 8, wherein the whip rod is configured to reduce scale buildup on a surface of the platform.

10. A system for managing temperature distribution of a phase change material, the system comprising:
    a platform comprising a passageway therethrough, the platform comprising a density that is less than a density of the phase change material when in a solid phase and greater than a density of the phase change material when in a liquid phase; and
    at least one extensible heat transfer fluid line configured to extend or retract as the platform moves between (1) a first position corresponding to a position of the platform when a majority of the phase change material is in the liquid phase and (2) a second position corresponding to a position of the platform when a majority of the phase change material is in the solid phase.

11. The system of claim 10, wherein the extensible heat transfer fluid line is tensioned.

12. The system of claim 10, further comprising a whip rod disposed at least partially in the passageway of the platform.

13. The system of claim 12, wherein the whip rod is an extendable whip rod.

14. The system of claim 13, wherein the whip rod comprises a variable length section.

15. A system for managing temperature distribution of a phase change material, the system comprising:
    a platform comprising a passageway therethrough, the platform comprising a density that is less than a density of the phase change material when in a solid phase and greater than a density of the phase change material when in a liquid phase,
    wherein the platform comprises:
    a base portion configured to extend laterally along a line between a first phase and a second phase of the phase change material; and
    a housing portion affixed to, and extending from, the base portion,
    wherein the passage passes through the base portion and the housing portion.

16. The system of claim 15, wherein the base portion has a width and the housing portion has a width and the base portion width is greater than the housing portion width.

17. The system of claim 15, further comprising an extensible heat transfer fluid line configured to extend or retract as the platform moves between (1) a first position corresponding to a position of the platform when a majority of the phase change material is in the liquid phase and (2) a second position corresponding to a position of the platform when a majority of the phase change material is in the solid phase.

18. The system of claim 17, wherein the extensible heat transfer fluid line passes through the base portion and the housing portion.

19. The system of claim 15, wherein the base portion and the housing portion both comprises a generally rectangular cuboid shape, and
    wherein the passage comprises a generally cylindrical shape.

20. A method for managing temperature distribution of a phase change material, the method comprising:
    providing a platform comprising a passageway therethrough, the platform comprising a density that is less than a density of the phase change material when in a solid phase and greater than a density of the phase change material when in a liquid phase; and
    providing an extendable whip rod whip rod disposed at least partially in the passageway of the platform.

* * * * *